US010900202B2

(12) United States Patent
Hansby et al.

(10) Patent No.: US 10,900,202 B2
(45) Date of Patent: Jan. 26, 2021

(54) SYSTEMS AND METHODS FOR GENERATING OPERATIONAL MACHINE HEADING (71) Applicant: Caterpillar Trimble Control Technologies LLC, Dayton, OH (US)

(72) Inventors: Michael Anthony Hansby, Christchurch (NZ); Benjamin Jamie Vickery, Christchurch (NZ); Liam Hennessy, Christchurch (NZ)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 257 days.

(21) Appl. No.: 15/979,016

(22) Filed: May 14, 2018

(65) Prior Publication Data
US 2019/0345696 A1 Nov. 14, 2019

(51) Int. Cl.
*E02F 9/26* (2006.01)
*G01S 19/45* (2010.01)
*G01S 19/51* (2010.01)
*G01S 19/10* (2010.01)
*G01S 19/14* (2010.01)
*E02F 9/22* (2006.01)
(Continued)

(52) U.S. Cl.
CPC ............. *E02F 9/264* (2013.01); *G01S 19/10* (2013.01); *G01S 19/14* (2013.01); *G01S 19/45* (2013.01); *G01S 19/51* (2013.01); *E02F 9/22* (2013.01); *E02F 9/265* (2013.01); *G01S 19/42* (2013.01); *G01S 19/53* (2013.01)

(58) Field of Classification Search
CPC combination set(s) only.
See application file for complete search history.

(56) References Cited

U.S. PATENT DOCUMENTS

| 5,438,771 A | 8/1995 | Sahm et al. |
| 8,634,993 B2 | 1/2014 | McClure et al. |
| (Continued) | | |

OTHER PUBLICATIONS

Borgstrom, "GNSS Antenna Modules: global positioning made easy", Electronics News, Sep. 28, 2014.
(Continued)

*Primary Examiner* — Christian Chace
*Assistant Examiner* — Amelia Vorce
(74) *Attorney, Agent, or Firm* — Dinsmore & Shohl LLP (57) ABSTRACT

A material moving machine includes a chassis, a dual-sensor position sensor system including a master and a slave, and a controller. The master and the slave are each configured to generate independent position signals representing a machine position. The controller is programmed to determine whether the machine is tramming, determine whether the master and the slave are operational, determine a center of rotation (COR) of the chassis when the machine is not tramming, and determine heading(s) based on a pair selected from the COR, an operational master, and an operational slave. The controller is further programmed to determine a prioritized heading based on at least one of the operational master and the operational slave and based on an order of priority that ranks the heading(s), use the prioritized heading to generate the machine heading when the machine is not tramming, and operate the machine based on the machine heading.

20 Claims, 5 Drawing Sheets

(51) Int. Cl.
    *G01S 19/53*    (2010.01)
    *G01S 19/42*    (2010.01)

(56)            References Cited

U.S. PATENT DOCUMENTS

| | | | |
|---|---|---|---|
| 8,689,471 B2 | 4/2014 | Carpenter et al. | |
| 8,793,000 B2 | 7/2014 | Mujtaba et al. | |
| 9,238,570 B2* | 1/2016 | Schoonmaker | B66C 13/46 |
| 9,598,845 B2* | 3/2017 | Baba | E02F 9/2033 |
| 9,823,082 B2* | 11/2017 | Lewis | G01C 21/3407 |
| 10,120,369 B2* | 11/2018 | Taylor | E02F 3/308 |
| 2008/0000111 A1 | 1/2008 | Green | |
| 2008/0047170 A1 | 2/2008 | Nichols | |
| 2010/0283675 A1* | 11/2010 | McAree | E02F 3/435 |
| | | | 342/357.28 |
| 2010/0312428 A1* | 12/2010 | Roberge | G01S 19/53 |
| | | | 701/23 |
| 2012/0281553 A1 | 11/2012 | Mujtaba et al. | |
| 2012/0316686 A1* | 12/2012 | Dueckman | B66C 13/40 |
| | | | 700/275 |
| 2014/0039772 A1* | 2/2014 | Jensen | B60K 23/0808 |
| | | | 701/69 |
| 2018/0237148 A1* | 8/2018 | Hehn | B64C 39/024 |

OTHER PUBLICATIONS

Kellogg Report, http://www.kelloggreport.com/are-two-GPS-antennae-better-than-one-html, Sep. 18, 2016.

* cited by examiner

SYSTEMS AND METHODS FOR GENERATING OPERATIONAL MACHINE HEADING

BACKGROUND

The present disclosure relates to material moving machines and, in some embodiments, to material moving machines including material moving implements, such as excavators including excavating implements. Such excavators, for the purposes of defining and describing the scope of the present application, comprise an excavator boom and an excavator stick subject to swing and curl, and an excavating implement that is subject to swing and curl control with the aid of the excavator boom and excavator stick, or other similar components for executing swing and curl movement. For example, and not by way of limitation, many types of excavators comprise a hydraulically or pneumatically or electrically controlled excavating implement that can be manipulated by controlling the swing and curl functions of an excavating linkage assembly of the excavator. Excavator technology is, for example, well represented by the disclosures of U.S. Pat. No. 8,689,471, which is assigned to Caterpillar Trimble Control Technologies LLC and discloses methodology for sensor-based automatic control of an excavator, US 2008/0047170, which is assigned to Caterpillar Trimble Control Technologies LLC and discloses an excavator 3D laser system and radio positioning guidance system configured to guide a cutting edge of an excavator bucket with high vertical accuracy, and US 2008/0000111, which is assigned to Caterpillar Trimble Control Technologies LLC and discloses methodology for an excavator control system to determine an orientation of an excavator sitting on a sloped site.

BRIEF SUMMARY

According to the subject matter of the present disclosure, a material moving machine comprises a machine chassis, a linkage assembly coupled to the machine chassis, a dual-sensor position sensor system comprising a master position sensor and a slave position sensor, and control architecture comprising a drive sensor, a navigation system, and an architecture controller. The master position sensor and the slave position sensor are each respectively disposed in a fixed position with respect to the machine chassis and are each configured to generate independent position signals representing a position of the material moving machine. The architecture controller is programmed to execute machine readable instructions to determine whether the material moving machine is tramming in movement along a ground surface based on a tramming signal generated by the drive sensor, determine whether the master position sensor and the slave position sensor are operational based on the respective independent position signals generated by the master position sensor and the slave position sensor indicative of an operational master position sensor and an operational slave position sensor, determine a center of rotation of the machine chassis when the material moving machine is not tramming, and determine one or more headings, each heading based on a pair selected from the center of rotation, the operational master position sensor, and the operational slave position sensor. The architecture controller is further programmed to execute machine readable instructions to prioritize the one or more headings to determine a prioritized heading based on at least one of the operational master position sensor and the operational slave position sensor and based on an order of priority that ranks the one or more headings, use the prioritized heading to generate the machine heading when the material moving machine is not tramming, and operate the material moving machine utilizing the architecture controller to move the linkage assembly with respect to the machine chassis, the machine chassis with respect to the ground surface, or both, based on the machine heading.

In accordance with one embodiment of the present disclosure, an excavator comprises a machine chassis and an excavating implement, a linkage assembly coupled to the machine chassis, the linkage assembly comprises an excavator boom and an excavator stick that collectively define a plurality of linkage assembly positions, the linkage assembly is configured to move with, or relative to, the machine chassis, the excavator stick is configured to curl relative to the excavator boom, the excavating implement is mechanically coupled to the excavator stick, a dual-sensor position sensor system comprising a master position sensor and a slave position sensor, and control architecture comprising a drive sensor, a navigation system, and an architecture controller. The master position sensor and the slave position sensor are each respectively disposed in a fixed position with respect to the machine chassis and are each configured to generate independent position signals representing a position of the excavator. The architecture controller is programmed to execute machine readable instructions to determine whether the excavator is tramming in movement along a ground surface based on a tramming signal generated by the drive sensor, determine by the navigation system whether the master position sensor and the slave position sensor are operational based on the respective independent position signals generated by the master position sensor and the slave position sensor indicative of an operational master position sensor and an operational slave position sensor, determine a center of rotation of the machine chassis when the excavator is not tramming and is in a working position based on a circular fitting analysis, determine one or more headings, each heading based on a pair selected from the center of rotation, the operational master position sensor, and the operational slave position sensor, and prioritize the one or more headings to determine a prioritized heading based on at least one of the operational master position sensor and the operational slave position sensor and based on an order of priority that ranks the one or more headings. A master position sensor heading is the prioritized heading when the master position sensor is operational, and the machine heading is generated from the master position sensor heading based on the operational master position sensor and the center of rotation. A slave position sensor heading is the prioritized heading when the slave position sensor is operational and the master position sensor is not operational, and the machine heading is generated from the salve position sensor heading based on the operational slave position sensor and the center of rotation. The architecture controller is further programmed to execute machine readable instructions to use the prioritized heading to generate the machine heading when the excavator is not tramming, use the master position sensor and the slave position sensor to generate the machine heading when the excavator is tramming and both the master position sensor and the slave position sensor are operational, use the navigation system and an operational one of the master position sensor and the slave position sensor to use an available sensor position without a heading in place of the machine heading when the excavator is tramming and only one of the master position sensor and the slave position sensor is operational, and operate the excavator utilizing the architecture controller to move the linkage assembly with respect to the machine chassis, the machine chassis with respect to the ground surface, or both, based on the machine heading or the available sensor position.

In accordance with another embodiment of the present disclosure, a method of determining a position and heading of a material moving machine comprises disposing the material moving machine on a ground surface. The material moving machine comprises a machine chassis, a linkage assembly coupled to the machine chassis, a dual-sensor position sensor system comprising a master position sensor and a slave position sensor, and control architecture comprising a drive sensor, a navigation system, and an architecture controller. The master position sensor and the slave position sensor are each respectively disposed in a fixed position with respect to the machine chassis and are each configured to generate independent position signals representing a position of the material moving machine. The method further comprises determining whether the material moving machine is tramming in movement along the ground surface based on a tramming signal generated by the drive sensor, determining whether the master position sensor and the slave position sensor are operational based on the respective independent position signals generated by the master position sensor and the slave position sensor indicative of an operational master position sensor and an operational slave position sensor, determining a center of rotation of the machine chassis when the material moving machine is not tramming, and determining one or more headings, each heading based on a pair selected from the center of rotation, the operational master position sensor, and the operational slave position sensor. The method further comprises prioritizing the one or more headings to determine a prioritized heading based on at least one of the operational master position sensor and the operational slave position sensor and based on an order of priority that ranks the one or more headings, using the prioritized heading to generate the machine heading when the material moving machine is not tramming, and operating the material moving machine utilizing the architecture controller to move the linkage assembly with respect to the machine chassis, the machine chassis with respect to the ground surface, or both, based on the machine heading.

Figure 1:
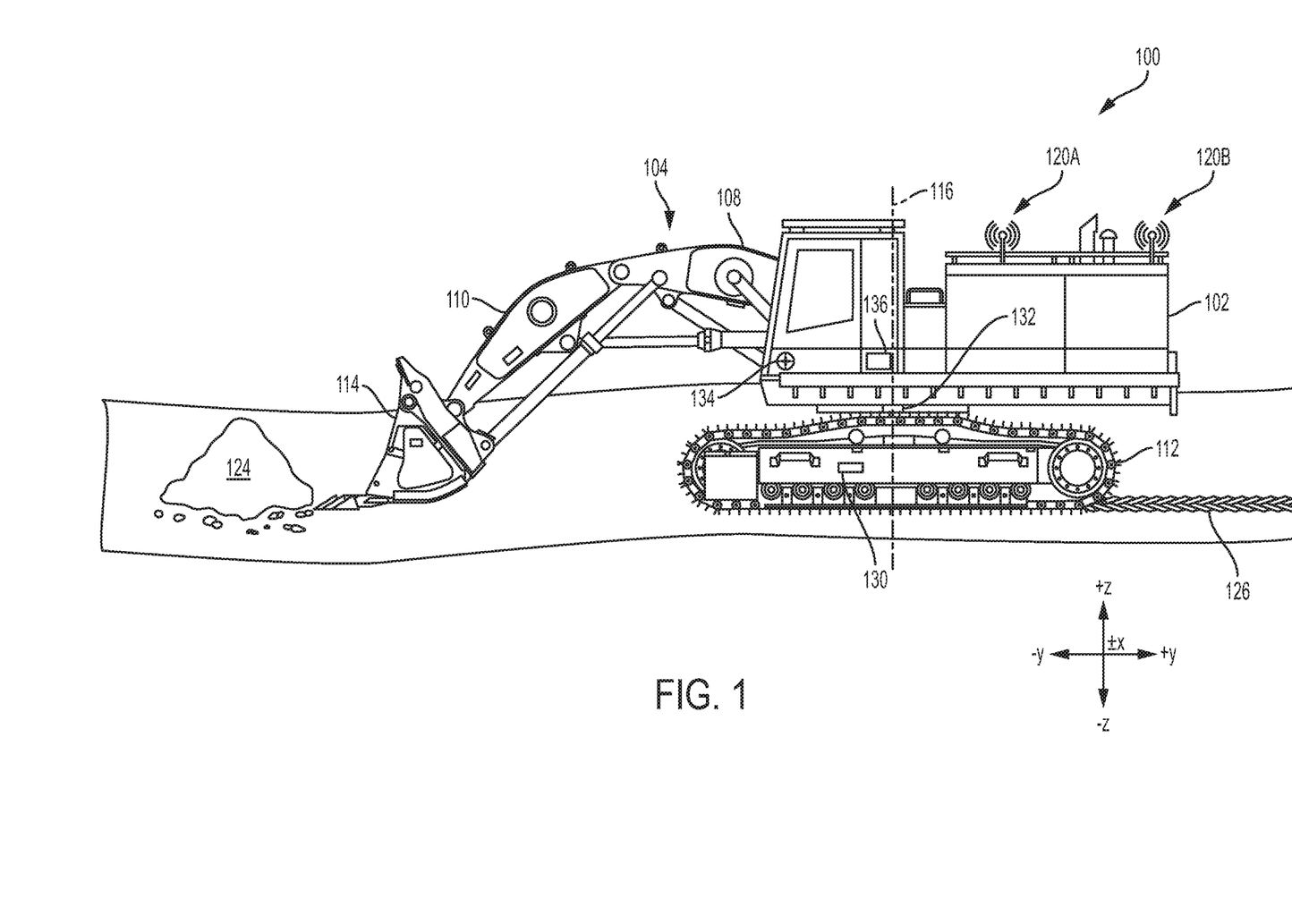
FIG. 1 is a side view of an excavator incorporating aspects of the present disclosure.

Although the concepts of the present disclosure are described herein with primary reference to the excavator illustrated in FIG. 1 as a material moving machine, it is contemplated that the concepts will enjoy applicability to any type of material moving machine, regardless of its particular mechanical configuration. For example, and not by way of limitation, the concepts may enjoy applicability to a backhoe loader including a backhoe linkage.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

The present disclosure relates to material moving machines configured to execute material moving tasks such as those involving material moving operations. For the purposes of the present disclosure, a material moving machine is designed to excavate, distribute, smooth, or otherwise move a material. For example, the material moving machine may comprise and use a material moving implement to excavate, distribute, smooth, or otherwise move material. Examples of such machines include, but are not limited to, excavators, backhoe loaders, dozers, pavers, motor graders, loaders, trenchers, scrapers, drills, crushers, draglines, cranes, or any type of machine that includes an implement for moving material. Contemplated materials include, but are not limited to, soil or other surface-based earth materials, subterranean materials, including materials to be mined, and construction aggregates, including, for example, substrate materials and paving materials.

More particularly, the material moving machines may be rotational machines including a chassis configured to swing with respect to an undercarriage. For example, and not by way of limitation, many types of excavators typically have a rotational chassis and a hydraulically controlled material moving implement that can be manipulated by a joystick or other means in an operator control station of the machine. The user of the machine may control the lift, tilt, angle, and pitch of the implement. In addition, one or more of these variables may also be subject to partially or fully automated control based on information sensed or received by a dynamic sensor of the machine such as a position sensor.

In the embodiments described herein, an architecture controller is programmed to execute machine readable instructions to determine a center of rotation of a machine chassis, determine one or more headings based on at least one of the center of rotation and an operational position sensor, and use a prioritized heading from the one or more headings to generate the machine heading for an excavator that is not tramming, as described in greater detail further below. Such determined values may be utilized by control architecture to operate the material moving machine while permitting seamless switching between the one or more headings based on an order of priority during machine operation to change the prioritized heading used to generate the machine heading when one of the headings becomes unavailable, as described in greater detail below.

Referring initially to FIG. 1, a material moving machine 100 is a rotational machine and includes a machine chassis 102. In FIG. 1, the material moving machine 100 is shown as a front shovel excavator, which is a type of rotational material moving machine configured to swing the machine chassis 102 about a center of rotation axis 116. A lateral direction of the material moving machine 100 is associated with the +/−machine x-axis direction depicted in FIG. 1, and is transverse to a rearward-forward+/−machine y-axis direction. An upward-downward+/−machine z-axis direction of the material moving machine 100 is depicted in FIG. 1 and is co-aligned with the center of rotation axis 116. The material moving machine 100 further includes a linkage assembly 104 coupled to the machine chassis 102, a dual-sensor position sensor system 120, and control architecture comprising a drive sensor 130, a swing sensor 132, a navigation system 134, an architecture controller 136, or any additional or alternative components designed to facilitate automated control of the various operating components of the material moving machine 100.

Figure 3:
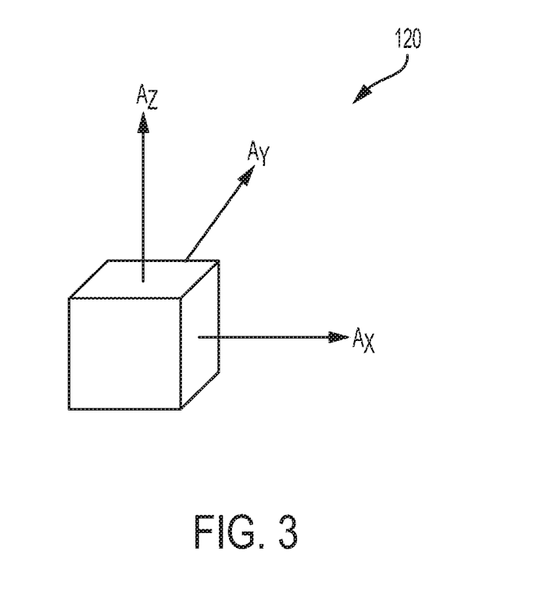
FIG. 3 is a perspective view of a position sensor of a dual-sensor position sensor system according to various concepts of the present disclosure.

Suitable sensors for the dual-sensor position sensor system 120 may include an inertial measurement unit (IMU), an inclinometer, an accelerometer, a gyroscope, an angular rate sensor, a rotary position sensor, a position sensing cylinder, a universal total station (UTS), an image sensor such as a camera, a laser scanner, or any sensor or combination of sensors that provide signals indicative of an operational characteristic of a component of the material moving machine 100. The IMU may include a 3-axis accelerometer and a 3-axis gyroscope. As shown in FIG. 3, a sensor of dual-sensor position sensor system 120 includes accelerations $A_x$, $A_y$, and $A_z$, respectively representing x-axis, y-axis, and z-axis acceleration values.

The linkage assembly 104 is configured to move with, or relative to, the machine chassis 102. The material moving machine 100 further may include an material moving implement 114, and the linkage assembly 104 may include a first limb and a second limb that collectively define a plurality of linkage assembly positions. The material moving implement 114 may be mechanically coupled to the second limb that is configured to curl relative to the first limb. In an embodiment in which the material moving machine 100 is an excavator, the material moving implement 114 is an excavating implement, the first limb is an excavator boom 108, and the second limb is an excavator stick 110.

Figure 2:
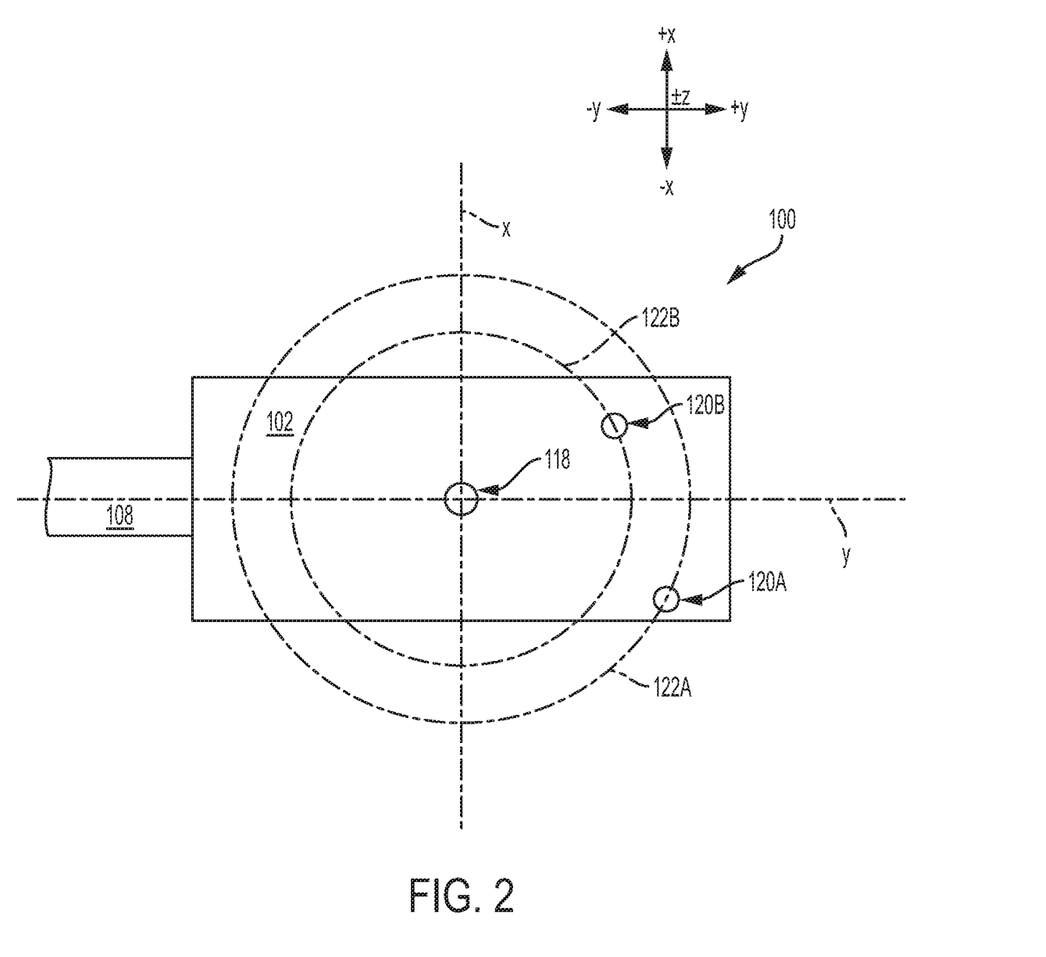
FIG. 2 is a top plan view of dual-sensor position sensor system including a pair of position sensors on a machine chassis of the excavator of FIG. 1.

The sensors of the dual-sensor position sensor system 120 may be referred to as a master position sensor 120A and a slave position sensor 120B. The master position sensor 120A and the slave position sensor 120B are each respectively disposed in a fixed position with respect to the machine chassis 102. As illustrated in FIG. 2 as a non-limiting example, the master position sensor 120A and the slave position sensor 120B are each respectively disposed in a fixed position with respect to a top surface of the machine chassis 102.

Each of the master position sensor 120A and the slave position sensor 120B are configured to generate independent position signals representing a position of the material moving machine 100. By utilizing a dual-sensor position sensor system 120 as described herein with the master position sensor 120A and slave position sensor 120B determining position independently of one another, seamless switching between a prioritized operational one of the master position sensor 120A and slave position sensor 120B may occur to determine machine position and heading as described herein without ceasing machine operation, for example. As a non-limiting example, through utilization of a prioritized position sensor to generate the machine heading, the material moving machine 100 may continue operation even where one of at least a pair of position sensors 120A, 120B degrades and is unusable for a period of time by seamlessly transitioning between dual or single operational sensor(s) 120A, 120B to determine machine position and machine heading as a machine pose, for example. In an embodiment, the master position sensor 120A is a master global navigation satellite system (GNSS) antenna, and the slave position sensor 120B is a slave GNSS antenna.

Figure 4:
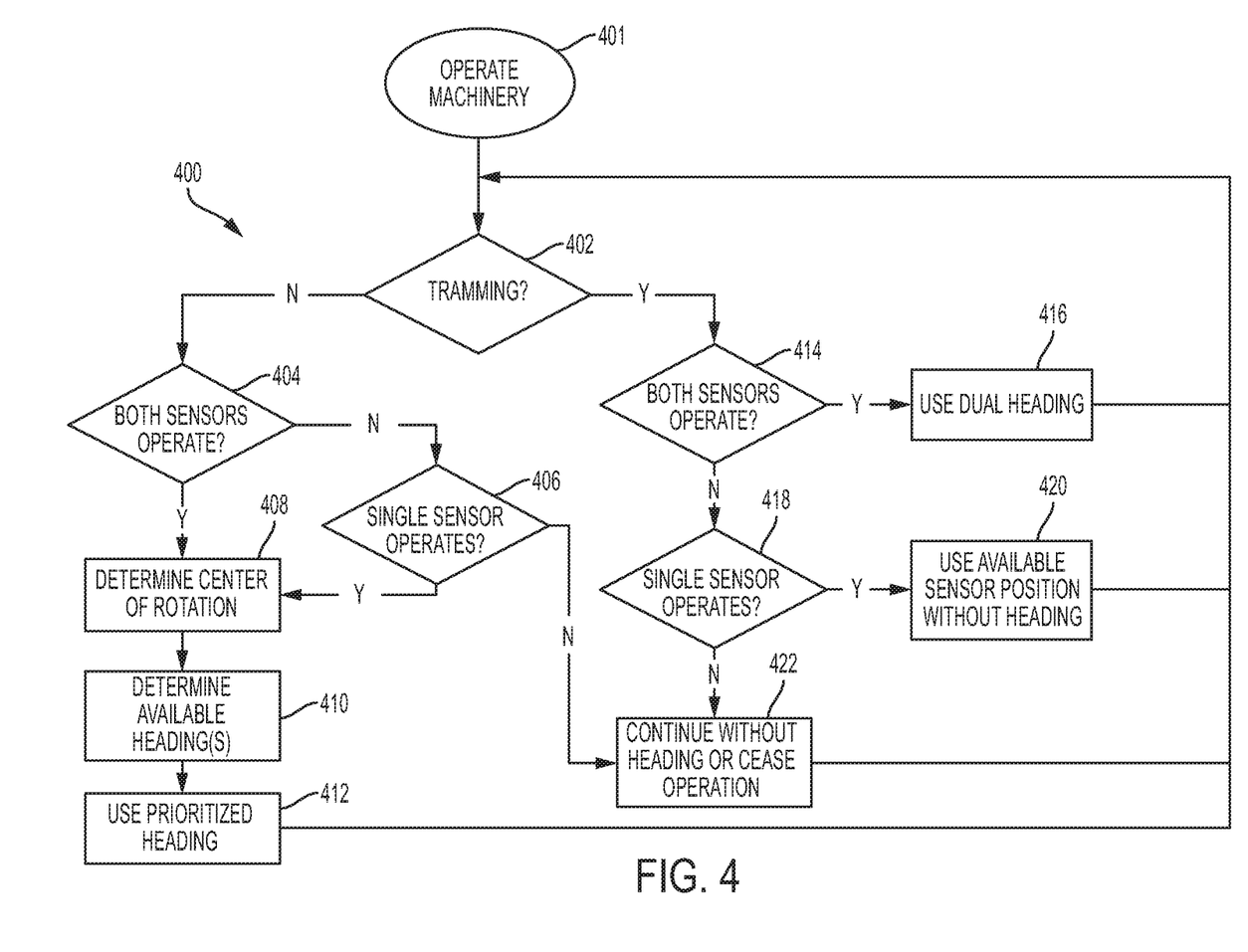
FIG. 4 is a flow chart of a process used to generate a machine heading for operation of a material moving machine.

FIG. 4 is a flow chart illustrating a control scheme 400 that can be used to generate a machine heading for the operation of a material moving machine 100, which machine may be operated in an automated, partially automated, or manual mode (see step 401). At step 402, the control scheme determines whether the material moving machine is tramming based on a tramming signal generated by a sensor such as, for example, the drive sensor 130. As described herein, "tramming" refers to a movement of the material moving machine 100 along a ground surface 126. For example, the material moving machine 100 may include a wheel track 112 that trams along the ground surface 126 to move the machine chassis 102 between different positions on the ground surface 126. The material moving machine 100 would be considered to be tramming when the machine chassis 102 is moving on the wheel track 112 along the ground surface 126.

When the material moving machine 100 is not tramming, the machine chassis 102 may be in a working position at a single location of the ground surface 126. In the working position, the machine chassis is able to swing about an undercarriage including the wheel track 112, and the linkage assembly 104 is able to move with respect to the machine chassis. For example, in the working position, the linkage assembly 104 may operate to smooth out, or otherwise move, a portion of a work pile 124 through use of the material moving implement 114, which is configured to pick up, smooth over, or otherwise move a portion of the work pile 124. The linkage assembly 104 may additionally or alternatively operate to use the material moving implement 114 to dig or excavate into the ground surface 126 and move the excavated earth to another location, such as to the work pile 124.

When the tramming signal indicates that the material moving machine 100 is not tramming, such that the machine chassis 102 is in the working position, the control scheme 400 may move to step 404. In step 404, the architecture controller 136 is programmed to execute machine readable instructions to determine whether the master position sensor 120A and the slave position sensor 120B are operational based on the respective independent position signals generated by the master position sensor 120A and the slave position sensor 120B. If both of the position sensors 120A, 120B are not operational, the control scheme 400 determines in step 406 whether one of the master position sensor 120A and the slave position sensor 120B is operational. As a non-limiting example, the architecture controller 136 may be programmed to execute machine readable instructions to determine by the navigation system 134 whether the master position sensor 120A and the slave position sensor 120B are operational based on the respective independent position signals generated by the master position sensor 120A and the slave position sensor 120B indicative of an operational master position sensor 120A and an operational slave position sensor 120B.

If both the master position sensor 120A and the slave position sensor 120B are determined to be operational in step 404, or if one of the master position sensor 120A and the slave position sensor 120B is determined to be operational in step 406, the control scheme 400 can proceed to step 408 to determine a center of rotation 118.

In particular, the architecture controller 136 is programmed to execute machine readable instructions to determine a center of rotation 118 of the machine chassis 102 when the material moving machine 100 is not tramming based on a tramming signal generated by a sensor. By way of example and not limitation, the tramming signal may be a drive signal generated by the drive sensor 130. The center of rotation 118 for the material moving machine 100 can be determined based on a circular fitting analysis when the material moving machine 100 is not tramming and is in a work position. For example, and not by way of limitation, the architecture controller 136 can be programmed to run the circular fitting analysis through instructions to utilize sensor position signals from the master position sensor 120A and the slave position sensor 120B. Failure of the circle fitting analysis may be indicative of a tramming state of the material moving machine 100, while a functional circular fit analysis may generate a center of rotation 118 for the material moving machine 100 in a working position as described herein. The architecture controller 136 may further be programmed to execute machine readable instructions to automatically determine and calculate pitch and roll of the machine chassis 102 from a calibration procedure such as the circular fitting analysis described herein.

Further, referring to FIG. 2, the architecture controller 136 can be programmed to estimate a circle path 122A, 122B based on the respective sensor position signals of the master position sensor 120A and the slave position sensor 120B. The circle path 122 is configured to fit through the fixed position of at least one of the master position sensor 120A and the slave position sensor 120B and, based on the circle path 122 and sensor position signals, determine a position of the center of rotation 118 on the machine chassis 102. Positions from each of the master position sensor 120A and the slave position sensor 120B may be used to calculate and estimate the circle path 122, from which a machine heading may be estimated. The center of rotation 118 is a point along the center of rotation axis 116 (FIG. 1) running through a vertical plane intersecting and perpendicular to the top surface of the machine chassis 102.

In alternative embodiments, the signal may be a chassis swing angle signal generated by the swing sensor 132. For example, and not by way of limitation, the architecture controller 136 can be programmed to run the circular fitting analysis through instructions to swing the machine chassis 102 of the material moving machine 100 to a swing angle that is greater than at least a predefined swing angle to output the chassis swing angle signal based on the swing angle and generated by the swing sensor 132. Such a circular fitting analysis may be undertaken as according to the method set forth in, for example, U.S. Pat. No. 5,438,771 assigned to Caterpillar Inc. of Peoria, Ill. Referring to FIG. 2, the architecture controller 136 can be programmed to estimate a circle path 122 based on the chassis swing angle signal. The circle path 122 is configured to fit through the fixed position of at least one of the master position sensor 120A and the slave position sensor 120B and, based on the circle path 122 and the chassis swing angle signal, determine a position of the center of rotation 118 on the machine chassis 102.

Referring again to FIG. 2, a prioritized heading, described in greater detail further below, may be based on the center of rotation 118 and a prioritized operational one of the master position sensor 120A and the slave position sensor 120B. The prioritized heading is used to generate the machine heading when the material moving machine 100 is not tramming. The machine heading may be generated based the respective position signal of the prioritized operational one of the master position sensor 120A and the slave position sensor 120B. As each of the master position sensor 120A and the slave position sensor 120B have a fixed position on the machine chassis 102, the machine heading may be generated further based on a distance between a position of the center of rotation 118 on the machine chassis 102 and the fixed position of the prioritized operational sensor 120A, 120B.

After step 408, the control scheme 400 may advance to step 410 to determine the available headings generated from operational ones of the master position sensor 120A and the slave position sensor 120B. By way of example and not by limitation, to determine one or more headings, each heading is determined based on a pair selected from the center of rotation 118, the operational master position sensor 120A, and the operational slave position sensor 120B. The one or more headings are prioritized to determine a prioritized heading based on at least one of the operational master position sensor 120A and the operational slave position sensor 120B and based on an order of priority that ranks the one or more headings, as described in greater detail further below.

The control scheme 400 then may proceed to step 412 to use the prioritized heading to generate the machine heading. For example, and not by way of limitation, instructions to use the prioritized heading to generate the machine heading when the material moving machine 100 is not tramming include instructions to generate a respective sensor position with respect to the ground surface 126 from a respective independent position signal of the master position sensor 120A and the slave position sensor 120B. The respective independent position signal may be from a prioritized operational one of the master position sensor 120A and the slave position sensor 120B. The instructions may further be to generate the machine heading based on the center of rotation 118 and the respective sensor position.

The architecture controller 136 may be programmed to execute machine readable instructions to prioritize the master position sensor 120A and the slave position sensor 120B based on an order of priority that ranks an operational master position sensor ahead of an operational slave position sensor, and to use the center of rotation and the prioritized operational one of the master position sensor 120A and the slave position sensor 120B to generate the machine heading when the material moving machine 100 is not tramming.

The master position sensor 120A and the slave position sensor 120B may be prioritized depending on which one is operational. More specifically, when the master position sensor 120A is operational, the master position sensor 120A may be prioritized, and the machine heading is generated based on the master position sensor 120A and the center of rotation 118. When the slave position sensor 120B is operational and the master position sensor 120A is not operational, the slave position sensor 120B may be prioritized, and the machine heading is generated based on the slave position sensor 120B and the center of rotation 118.

In an embodiment, the order of priority ranks the one or more headings such that a master position sensor heading is the prioritized heading of the one or more headings when the master position sensor 120A is operational, and the machine heading is generated from the master position sensor heading based on the operational master position sensor 120A and the center of rotation 118, and a slave position sensor heading is the prioritized heading of the one or more headings when the slave position sensor 120B is operational and the master position sensor 120A is not operational, and the machine heading is generated from the slave position sensor heading based on the operational slave position sensor 120B and the center of rotation 118.

In another embodiment, the order of priority ranks the one or more headings such that a dual sensor heading is the prioritized heading of the one or more headings when both the master position sensor 120A and the slave position sensor 120B are operational, and the machine heading is generated from the dual sensor heading based on the operational master position sensor 120A and the operational slave position sensor 120B. The order of priority further ranks the one or more headings such that a master position sensor heading is the prioritized heading of the one or more headings when the master position sensor 120A is operational and the slave position sensor 120B is not operational, and the machine heading is generated from the master position sensor heading based on the operational master position sensor 120A and the center of rotation 118, and a slave position sensor heading is the prioritized heading of the one or more headings when the slave position sensor 120B is operational and the master position sensor 120A is not operational, and the machine heading is generated from the slave position sensor heading based on the operational slave position sensor 120B and the center of rotation 118.

In yet another embodiment, the order of priority ranks the one or more headings based on a lowest error of one or more errors associated with at least one of a dual sensor heading based on the operational master position sensor 120A and the operational slave position sensor 120B, a master position sensor heading based on the operational master position sensor 120A and the center of rotation 118, and a slave position sensor heading based on the operational slave position sensor 120B and the center of rotation 118. Each error may be based on one or more horizontal position error and vertical position error values received from a respective receiver for the master position sensor 120A and the slave position sensor 120B.

When the tramming signal indicates that the material moving machine 100 is tramming, the control scheme 400 may move from step 402 to step 414. In step 414, the control scheme 400 determines whether both of the master position sensor 120A and the slave position sensor 120B are operational. If both the master position sensor 120A and the slave position sensor 120B are operational, the architecture controller 136 may be programmed to execute machine readable instructions to use the master position sensor 120A and the slave position sensor 120B to determine a dual sensor heading and generate the machine heading based on the dual sensor heading when the material moving machine is tramming such that a dual mode machine heading based on the dual sensor heading is generated in step 416.

As a non-limiting example, the master position sensor 120A and the slave position sensor 120B can be used to generate a machine heading when the material moving machine 100 is tramming and both the master position sensor 120A and the slave position sensor 120B are operational. The machine heading may be generated based on the respective independent position signal of each of the master position sensor 120A and the slave position sensor 120B. The generated machine heading can be further based on a distance between the fixed position of each of the master position sensor 120A and the slave position sensor 120B on the machine chassis 102. Additionally, the machine heading can be based on independent position signals of the master position sensor 120A and the slave position sensor 120B. Further, machine heading is transverse to a distance between the master position sensor 120A and the slave position sensor 120B, and the machine heading faces in a direction away from the distance and toward a forward portion of the machine chassis 102 such that it is a forward-facing machine heading.

If both the master position sensor 120A and the slave position sensor 120B are not operational, the control scheme 400 moves on to step 418. In step 418, the control scheme 400 may determine whether one of the master position sensor 120A and the slave position sensor 120B is operational while the other is not operational. Referring to step 418, if one of the master position sensor 120A and the slave position sensor 120B is operational while the other is not operational, the architecture controller 136 can be programmed to execute machine readable instructions to use the navigation system 134 and an operational one of the master position sensor 120A and the slave position sensor 120B to use an available sensor position without a heading in place of the machine heading when the material moving machine 100 is tramming. To facilitate this, the available sensor position in step 420 can be based on a global positioning system (GPS) signal generated from the navigation system 134 and respective independent position signals from one of the sensors 120A, 120B.

When neither of the master position sensor 120A and the slave position sensor 120B is operational, the control scheme 400 may advance from step 418 to step 422. At step 422, machine operation may continue without the use of a generated heading, such as through manual mode operational alone through an operator. Alternatively, machine operation may cease until at least one of the master position sensor 120A and the slave position sensor 120B is operational. For example, corrective action may be taken to bring at least one of the master position sensor 120A and the slave position sensor 120B back to an operational status.

The architecture controller 136 is further programmed to execute machine readable instructions to operate the material moving machine 100 utilizing the architecture controller 136 to move the linkage assembly 104 with respect to the machine chassis 102, the machine chassis 102 with respect to the ground surface 126, or both, based on the machine heading.

Referring to FIG. 4, the control scheme 400 may continually operate to return to step 402 to determine if the material moving machine 100 is tramming and whether both the master position sensor 120A and the slave position sensor 120B are operational (see respective steps 404 and 414). When the material moving machine is not tramming, the control scheme 400 determines a center of rotation 118 as set forth above. The center of rotation 118 can be utilized as an alternative position determination, similar to an alternative GNSS antenna, the determined position of which is utilized with the prioritized operational one of the master position sensor 120A and the slave position sensor 120B to generate the machine heading. If neither of the master position sensor 120A and the slave position sensor 120B are operational, the control scheme moves from step 406 to step 422 to take an action, as described above. For example, the machine operation may be continued without use of generated heading, or machine operation may be ceased in step 422 until at least one of the master position sensor 120A and the slave position sensor 120B is operational.

Referring to steps 402, 414, and 416, if the material moving machine is tramming, and both of the master position sensor 120A and the slave position sensor 120B are operational both sensors 120A, 120B are used to generate the machine heading. However, referring to step 416, if only one of the master position sensor 120A and slave position sensor 120B is operational, the position signal generated from the operational sensor 120A without a heading can be used in place of the machine heading. In such an instance, while an exact machine heading is not generated, the available position signal without a heading generated by a GPS system and a signal from the operational sensor allows a user and/or the architecture controller 136 to map positions of the material moving machine 100 during tramming to determine a tramming path.

Through the control scheme 400, whether the material moving machine 100 is tramming or not, the dual-sensor position sensor system 120 is utilized to seamlessly transition between use of the pair of the master position sensor 120A and slave position sensor 120B or at least a prioritized operational one of the master position sensor 120A and slave position sensor 120B to generate the machine heading. In such a manner, machine operation may be continued until neither of the master position sensor 120A and slave position sensor 120B is operational.

As a non-limiting example, the dual-sensor position sensor system 120 may be employed as a single-sensor position sensor system to generate a machine heading when one position sensor of the master position sensor 120A and slave position sensor 120B degrades such that the one position sensor is not operational. Furthermore, when both of the master position sensor 120A and slave position sensor 120B return to operational status, the single-sensor position sensor system is able to transition back to the dual-sensor position sensor system 120 to generate the machine heading. For example, when both of the master position sensor 120A and slave position sensor 120B are operational, the machine heading can be generated based on either both of the master position sensor 120A and slave position sensor 120B when the material moving machine 100 is tramming to generate a dual heading as set forth in step 416. Alternatively, the machine heading can be generated based on a prioritized operational one of the master position sensor 120A and slave position sensor 120B along with a determined center of rotation 118 when the material moving machine is not tramming to generate and use a prioritized machine heading as set forth in step 412.

Figure 5:
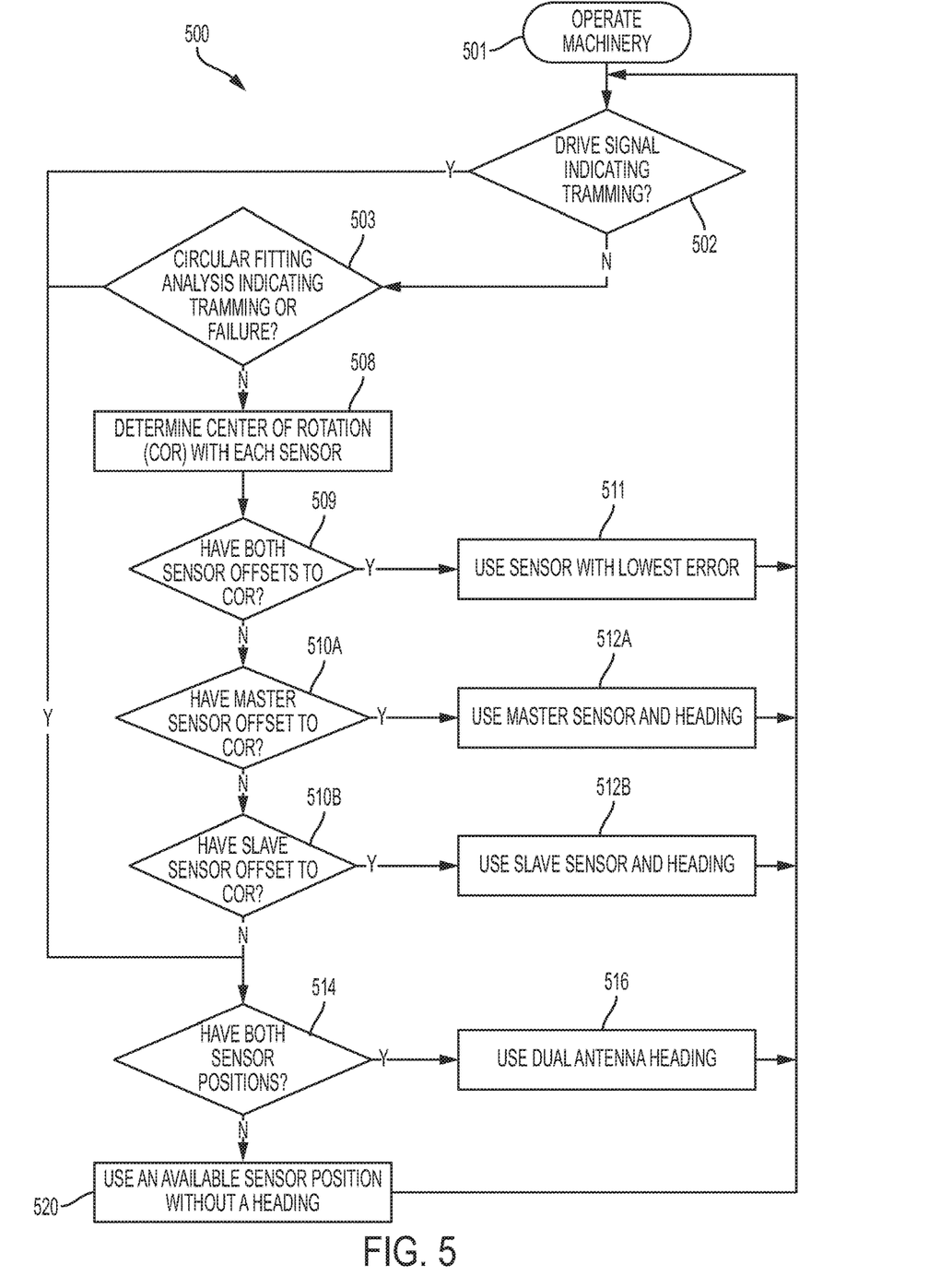
FIG. 5 is a flow chart of another process used to generate a machine heading for operation of a material moving machine.

FIG. 5 is a flow chart illustrating a control scheme 500 that can be used to generate a machine heading for the operation of a material moving machine 100, which machine may be operated in an automated, partially automated, or manual mode (see step 501). In an embodiment, at step 502, a drive signal generated from the drive sensor 130 may be used to determine if the material moving machine 100 is tramming. If the material moving machine 100 is tramming in step 502, the control scheme 500 advances to step 514, which is described in greater detail further below. If the material moving machine 100 is not tramming in step 502, the control scheme 500 advances to step 503. In step 503, a failure of the circular fitting analysis that further may be indicative of tramming advances the control scheme 500 to step 514. Otherwise, a functional circular fitting analysis determination in step 503 indicates the material moving machine 100 is not tramming and/or the circular fitting analysis has failed and advances the control scheme 500 to step 508. In step 508, a center of rotation 118 is determined from each of the master position sensor 120A and the slave position sensor 120B as available from which respective sensor offsets to the center of rotation 118 may be determined.

By way of example and not as a limitation, the center of rotation 118 is determined by rotating the material moving machine 100 and collecting position signals from at least one of the master position sensor 120A and the slave position sensor 120B. The position signals from each respective sensor 120A, 120B form respective circle paths 122A, 122B that are concentric about the same center of each circle, which is the center of rotation 118 of the material moving machine 100. An offset from each of the master position sensor 120A and the slave position sensor 120B to the center of rotation 118 may be recorded in a three-dimensional coordinate reference frame for the material moving machine 100. The recorded offsets for the master position sensor 120A and the slave position sensor 120B will be different, and there may be slight noise in the calculated center of rotation 118 based on respective position signals from each of the master position sensor 120A and the slave position sensor 120B.

If both sensor offsets to the center of rotation 118 are determined in step 509, sensor offset determination having a lowest error between the master position sensor 120A and the slave position sensor 120B is utilized to determine machine heading in step 511. However, if both sensor offsets to the center of rotation 118 are not determined, the control scheme 500 advances to step 510A to determine if the offset to the center of rotation 118 based on the master position sensor 120A is available. If so, the center of rotation and position data from the master position sensor 120A are utilized to determine machine heading in step 512A. If not, the control scheme 500 advances to step 510B to determine if the offset to the center of rotation 118 based on the slave position sensor 120B is available. If so, the center of rotation 118 and position data from the slave position sensor 120B are utilized to determine machine heading in step 512B. If not, the control scheme 500 advances to step 514. In embodiments, the center of rotation 118 is not available to advance the control scheme 500 to step 514 when the circular fitting analysis has failed such as when the material moving machine 100 is tramming.

In step 514, if independent position signals of both the master position sensor 120A and the slave position sensor 120B are available, a dual antenna heading based on the dual position signals may be generated and used in step 514. Such an approach is utilized when the material moving machine 100 is tramming, for example. If independent position signals of both the master position sensor 120A and the slave position sensor 120B are not available in step 514, the control scheme 500 advances to step 520 to determine if an independent position signal of the master position sensor 120A or the slave position sensor 120B is available to be utilized within a heading for machine operation. The control scheme 500 continues to advance between steps 502 to 520 as describes herein during machine operation.

A signal may be "generated" by direct or indirect calculation or measurement, with or without the aid of a sensor.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising." Likewise, one or more of the following claims utilize the term "based on", which similarly is an open-ended phrase that should be interpreted in like manner as the more commonly used open-ended preamble term "comprising."

What is claimed is:

1. A material moving machine comprising:
  a machine chassis;
  a linkage assembly coupled to the machine chassis;
  a dual-sensor position sensor system comprising a master position sensor and a slave position sensor, wherein the master position sensor and the slave position sensor are each respectively disposed in a fixed position with respect to the machine chassis and are each configured to generate independent position signals representing a position of the material moving machine; and
  control architecture comprising a drive sensor, a navigation system, and an architecture controller, wherein the architecture controller is programmed to execute machine readable instructions to
    determine whether the material moving machine is tramming in movement along a ground surface based on a tramming signal generated by the drive sensor,
    determine whether the master position sensor and the slave position sensor are operational based on the respective independent position signals generated by the master position sensor and the slave position sensor indicative of an operational master position sensor and an operational slave position sensor,
    determine a center of rotation of the machine chassis when the material moving machine is not tramming,
    determine two or more headings, each heading based on a pair selected from the center of rotation, the operational master position sensor, and the operational slave position sensor;
    prioritize at least two of the two or more headings to determine a prioritized heading based on at least one of the operational master position sensor and the operational slave position sensor and based on an order of priority that ranks the two or more headings;
    use the prioritized heading to generate the machine heading when the material moving machine is not tramming, and
    operate the material moving machine utilizing the architecture controller to move the linkage assembly with respect to the machine chassis, the machine chassis with respect to the ground surface, or both, based on the machine heading.

2. The material moving machine of claim 1, wherein the order of priority ranks the two or more headings such that:
  a master position sensor heading is the prioritized heading of the two or more headings when the master position sensor is operational, and the machine heading is generated from the master position sensor heading based on the operational master position sensor and the center of rotation; and
  a slave position sensor heading is the prioritized heading of the two or more headings when the slave position sensor is operational and the master position sensor is not operational, and the machine heading is generated from the slave position sensor heading based on the operational slave position sensor and the center of rotation.

3. The material moving machine of claim 1, wherein the order of priority ranks the two or more headings such that:
  a dual sensor heading is the prioritized heading of the two or more headings when both the master position sensor and the slave position sensor are operational, and the machine heading is generated from the dual sensor heading based on the operational master position sensor and the operational slave position sensor;
  a master position sensor heading is the prioritized heading of the two or more headings when the master position sensor is operational and the slave position sensor is not operational, and the machine heading is generated from the master position sensor heading based on the operational master position sensor and the center of rotation; and
  a slave position sensor heading is the prioritized heading of the two or more headings when the slave position sensor is operational and the master position sensor is not operational, and the machine heading is generated from the slave position sensor heading based on the operational slave position sensor and the center of rotation.

4. The material moving machine of claim 1, wherein the order of priority ranks the two or more headings based on a lowest error of two or more errors associated with at least one of:
  a dual sensor heading based on the operational master position sensor and the operational slave position sensor;
  a master position sensor heading based on the operational master position sensor and the center of rotation; and
  a slave position sensor heading based on the operational slave position sensor and the center of rotation.

5. The material moving machine of claim 4, wherein each error is based on one or more horizontal position error and vertical position error values received from a respective receiver for the master position sensor and the slave position sensor.

6. The material moving machine of claim 1, wherein the center of rotation for the material moving machine is determined based on a circular fitting analysis when the material moving machine is not tramming and is in a work position.

7. The material moving machine of claim 6, wherein the architecture controller is programmed to run the circular fitting analysis through instructions to utilize the independent position signals of the master position sensor and the slave position sensor to estimate a circle path based on the independent position signals and configured to fit through the fixed position of at least one of the master position sensor and the slave position sensor and, based on the circle path, determine a position of the center of rotation on the machine chassis.

8. The material moving machine of claim 7, wherein instructions to use the prioritized heading to generate the machine heading when the material moving machine is not tramming comprise instructions to generate the machine heading based on:
  the respective position signal of a prioritized operational one of the master position sensor and the slave position sensor; and a distance between the position of the center of rotation on the machine chassis and the fixed position of the prioritized operational one of the master position sensor and the slave position sensor on the machine chassis.

9. The material moving machine of claim 6, wherein the architecture controller is programmed to:
run the circular fitting analysis through instructions to swing the machine chassis of the material moving machine to a swing angle that is greater than at least a predefined swing angle to output the chassis swing angle signal based on the swing angle and generated by a swing sensor; and
estimate a circle path based on the chassis swing angle signal and configured to fit through the fixed position of at least one of the master position sensor and the slave position sensor and, based on the circle path and the chassis swing angle signal, determine a position of the center of rotation on the machine chassis.

10. The material moving machine of claim 1, wherein instructions to use the prioritized heading to generate the machine heading when the material moving machine is not tramming comprises instructions to:
generate a respective sensor position with respect to the ground surface from a respective independent position signal from a prioritized operational one of the master position sensor and the slave position sensor; and
generate the machine heading based on the center of rotation and the respective sensor position.

11. The material moving machine of claim 1, wherein when the material moving machine is not tramming, the machine heading is based on position signals of a prioritized operational one of the master position sensor and the slave position sensor, is transverse to a distance between the center of rotation and the prioritized operational one of the master position sensor and the slave position sensor, and faces in a direction away from the distance and toward a forward portion of the machine chassis.

12. The material moving machine of claim 1, wherein the architecture controller is programmed to execute machine readable instructions to use the master position sensor and the slave position sensor to determine a dual sensor heading and generate the machine heading based on the dual sensor heading when the material moving machine is tramming and both the master position sensor and the slave position sensor are operational.

13. The material moving machine of claim 12, wherein instructions to use the master position sensor and the slave position sensor to generate the machine heading based on the dual sensor heading comprise instructions to generate the machine heading based on:
the respective independent position signal of each of the master position sensor and the slave position sensor; and
a distance between the fixed position of each of the master position sensor and the slave position sensor on the machine chassis.

14. The material moving machine of claim 12, wherein when the material moving machine is tramming and both the master position sensor and the slave position sensor are operational, the machine heading is based on independent position signals of the master position sensor and the slave position sensor, is transverse to a distance between the master position sensor and the slave position sensor, and faces in a direction away from the distance and toward a forward portion of the machine chassis.

15. The material moving machine of claim 1, wherein the architecture controller is programmed to execute machine readable instructions to use the navigation system and an operational one of the master position sensor and the slave position sensor to use an available sensor position without a heading in place of the machine heading when the material moving machine is tramming and only one of the master position sensor and the slave position sensor is operational.

16. The material moving machine of claim 15, wherein when the material moving machine is tramming and only the one of the master position sensor and the slave position sensor is operational, the available sensor position is based on a global positioning system (GPS) signal generated from the navigation system and respective independent position signals of the one of the master position sensor and the slave position sensor.

17. The material moving machine of claim 1, wherein the architecture controller is programmed to execute machine readable instructions to determine by the navigation system whether the master position sensor and the slave position sensor are operational based on the respective independent position signals generated by the master position sensor and the slave position sensor.

18. The material moving machine of claim 1, wherein the master position sensor is a master global navigation satellite system (GNSS) antenna and the slave position sensor is a slave GNSS antenna.

19. An excavator comprising:
a machine chassis and an excavating implement;
a linkage assembly coupled to the machine chassis;
the linkage assembly comprises an excavator boom and an excavator stick that collectively define a plurality of linkage assembly positions;
the linkage assembly is configured to move with, or relative to, the machine chassis;
the excavator stick is configured to curl relative to the excavator boom;
the excavating implement is mechanically coupled to the excavator stick;
a dual-sensor position sensor system comprising a master position sensor and a slave position sensor, wherein the master position sensor and the slave position sensor are each respectively disposed in a fixed position with respect to the machine chassis and are each configured to generate independent position signals representing a position of the excavator; and
control architecture comprising a drive sensor, a navigation system, and an architecture controller, wherein the architecture controller is programmed to execute machine readable instructions to
determine whether the excavator is tramming in movement along a ground surface based on a tramming signal generated by the drive sensor,
determine by the navigation system whether the master position sensor and the slave position sensor are operational based on the respective independent position signals generated by the master position sensor and the slave position sensor indicative of an operational master position sensor and an operational slave position sensor,
determine a center of rotation of the machine chassis when the excavator is not tramming and is in a working position based on a circular fitting analysis,
determine two or more headings, each heading based on a pair selected from the center of rotation, the operational master position sensor, and the operational slave position sensor;
prioritize at least two of the two or more headings to determine a prioritized heading based on at least one of the operational master position sensor and the operational slave position sensor and based on an order of priority that ranks the two or more headings, wherein:
- a master position sensor heading is the prioritized heading when the master position sensor is operational, and the machine heading is generated from the master position sensor heading based on the operational master position sensor and the center of rotation; and
- a slave position sensor heading is the prioritized heading when the slave position sensor is operational and the master position sensor is not operational, and the machine heading is generated from the salve position sensor heading based on the operational slave position sensor and the center of rotation;

use the prioritized heading to generate the machine heading when the excavator is not tramming, use the master position sensor and the slave position sensor to generate the machine heading when the excavator is tramming and both the master position sensor and the slave position sensor are operational, use the navigation system and an operational one of the master position sensor and the slave position sensor to use an available sensor position without a heading in place of the machine heading when the excavator is tramming and only one of the master position sensor and the slave position sensor is operational, and operate the excavator utilizing the architecture controller to move the linkage assembly with respect to the machine chassis, the machine chassis with respect to the ground surface, or both, based on the machine heading or the available sensor position.

20. A method of determining a position and heading of a material moving machine, the method comprising:
   disposing the material moving machine on a ground surface, the material moving machine comprising a machine chassis, a linkage assembly coupled to the machine chassis, a dual-sensor position sensor system comprising a master position sensor and a slave position sensor, wherein the master position sensor and the slave position sensor are each respectively disposed in a fixed position with respect to the machine chassis and are each configured to generate independent position signals representing a position of the material moving machine, and control architecture comprising a drive sensor, a navigation system, and an architecture controller;

determining whether the material moving machine is tramming in movement along the ground surface based on a tramming signal generated by the drive sensor;

determining whether the master position sensor and the slave position sensor are operational based on the respective independent position signals generated by the master position sensor and the slave position sensor indicative of an operational master position sensor and an operational slave position sensor;

determining a center of rotation of the machine chassis when the material moving machine is not tramming;

determining two or more headings, each heading based on a pair selected from the center of rotation, the operational master position sensor, and the operational slave position sensor;

prioritizing at least two of the two or more headings to determine a prioritized heading based on at least one of the operational master position sensor and the operational slave position sensor and based on an order of priority that ranks the two or more headings;

using the prioritized heading to generate the machine heading when the material moving machine is not tramming; and operating the material moving machine utilizing the architecture controller to move the linkage assembly with respect to the machine chassis, the machine chassis with respect to the ground surface, or both, based on the machine heading.

\* \* \* \* \*